Patented May 15, 1951

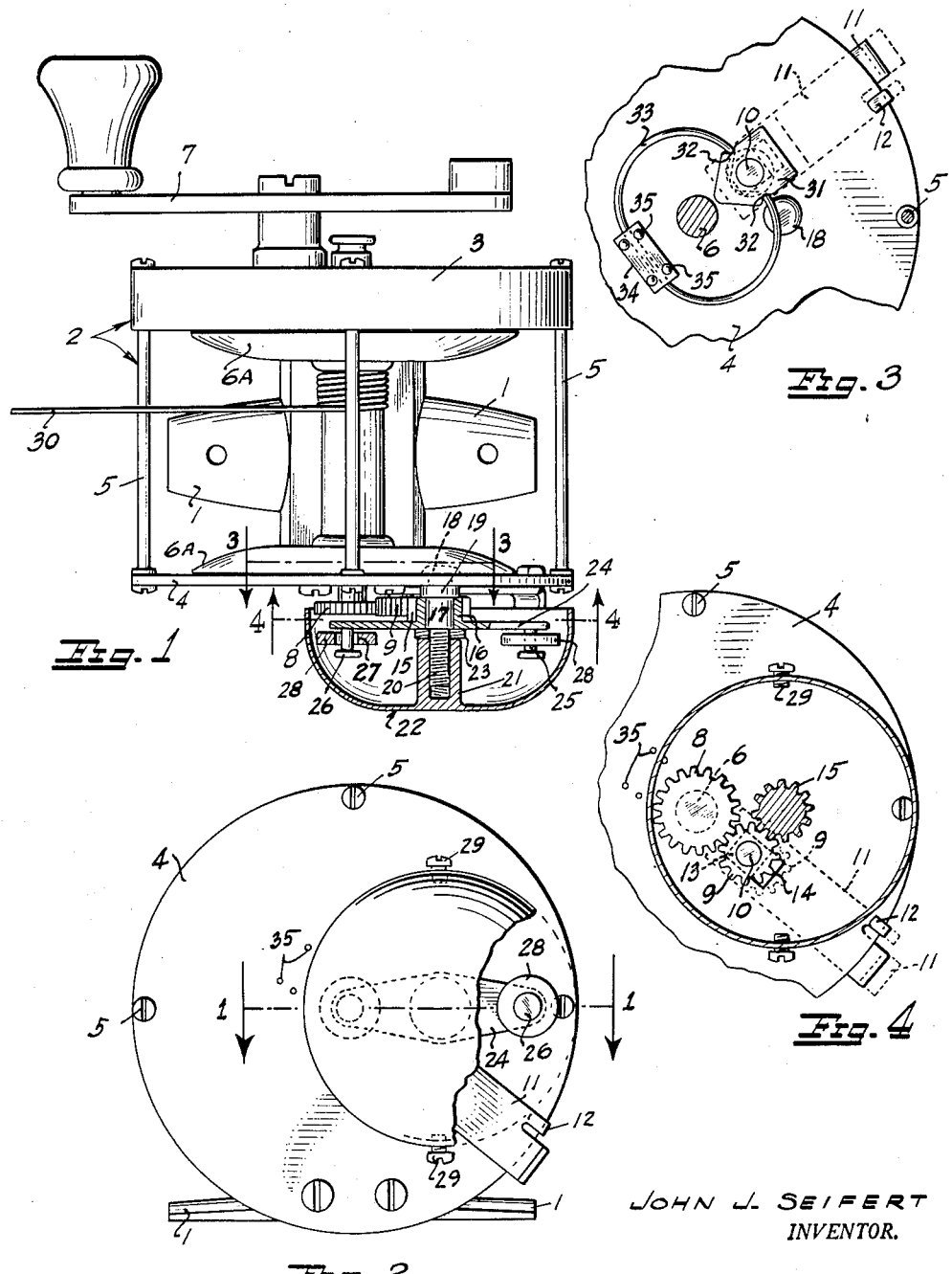

2,553,480

UNITED STATES PATENT OFFICE 2,553,480

SOUND-PRODUCING ALARM FOR FISHING REELS

John J. Seifert, Portland, Oreg.

Application March 7, 1949, Serial No. 79,935

1 Claim. (Cl. 242—84.1)

1

This invention relates to improvements in fishing reels.

It is one of the principal objects of the invention to provide an alarm actuated by the reel when the fishing line is struck by a fish and starts to pay out from the reel.

Another object of the invention is the provision of an alarm of this character which is of simple, efficient, durable, and inexpensive construction and readily adaptable to reels of all kinds as an attachment thereto or which may be built into the reel during its manufacture.

These and other objects will appear as my invention is more fully hereinafter described in the following specification, illustrated in the accompanying drawing, and finally pointed out in the appended claim.

In the drawing:

Figure 1 is a top plan view of a fishing reel and an alarm made in accordance with my invention and partly in section for convenience of illustration. The section is taken approximately along the line 1—1 of Figure 2.

Figure 2 is a side elevation of Figure 1.

Figure 3 is a fragmentary detail view taken approximately along the line 3—3 of Figure 1.

Figure 4 is a sectional detail view taken approximately along the line 4—4 of Figure 1.

Referring now more particularly to the drawing:

In Figures 1 and 2, reference numeral 1 indicates a base to which is secured in the conventional manner a reel frame generally indicated at 2, and which includes a gear housing 3 and an end plate 4 secured in spaced relation to each other by the usual spacer rods 5.

Rotatably mounted within the frame, by means of its shaft 6 extending through the end plate 4 and one wall of the gear housing, is a reel 6A operatively connected in the conventional manner with an actuating handle 7. The end of the reel shaft 6 which extends through the end of the plate 4 is provided with a driving gear 8 adapted to be selectively engaged by a gear 9 rotatably mounted, by means of a stub shaft 10 to a shifting plate 11 slidably mounted for radial movement on the outside face of the end plate 4 and formed with a portion 12 folded over on itself for engagement with the peripheral edge of the end plate 4. The shaft 10 is provided with a squared portion 13 which is slidably embraced by a rectangular-shaped opening 14 formed in the end plate 4. Thus, by inward movement of the shifting plate 11, the gear 9 may be moved into and out of mesh with the

2 gear 8 on the reel shaft 6. Meshing at all times with the gear 9 is a clapper actuating gear 15, whose hub portion forms a bearing sleeve 16 for rotatable mounting upon a pin 17 secured by its head 18 and shoulder portion 19 to the end plate 4. The outer end of the pin is reduced and threaded as at 20 to receive the internally threaded central tubular portion 21 of a bell 22. For maintaining the bell in a properly adjusted position upon the pin 19, I interpose a lock washer or the like as indicated at 23 between the end of the tubular portion 21 of the bell and the inner end of the threaded portion of the pin. The hub or sleeve portion 16 of the gear 15 is formed integral with a clapper arm 24 whose ends are provided with pins 25 formed with heads 26. Upon these pins I loosely attach, by means of enlarged openings 27, clappers indicated at 28. At diametrically opposed points through the skirt of the bell, I provide screws or threaded pins 29 whose inner ends are adapted to be adjusted toward or away from the circular path of movement of the clappers 28. These pins are disposed in vertical alignment with each other so that initial rotation of the clapper arm 24 will cause either clapper to strike the closest pin before completing an entire revolution, since it is important that the alarm be sounded at the same instant the reel is caused to rotate by an outward pull on the fish line 30 coiled about the reel.

Rotation is imparted to the clapper arm 24 only when the gears are in mesh as shown in Figure 4, which is caused by inward movement of the shifting plate 11. Reverse movement of the shifting plate to its dotted line positions shown in Figures 3 and 4 will, of course, withdraw the gear 9 from the gear 8 which will then enable the reel to run freely in a normal manner.

For maintaining the gear 9 either in mesh or out of mesh with the gear 8, I provide the inner end of the shifting plate 11 with a locking plate 31 also secured to the shifting plate by means of the stub shaft 10. The shifting plate is tapered toward its innermost end as shown away from a pair of opposed notches 32 with which the ends of a split ring 33 engage for maintaining the shifting plate in its inward position for meshing the gears 9 and 8. When the plate is pulled outwardly, the ends of the spring bear against the tapered sides of the end of the plate for holding the gears 9 and 8 out of mesh. The spring is secured to the end plate 4 by any suitable means, such as a clip 34 secured in place by rivets 35.

Although I have shown and described the invention as applied to a fishing reel, this, of course, does not prescribe its limits of utility, since, obviously, the invention may be readily adapted to various types of reels, winding drums, winches, and the like, where it is desirable to sound an alarm upon rotation of the reel.

It is also to be understood that I do not wish to be limited to the particular type of bell shown and described, since bells of various shapes may be employed; for example, a bell could be made in a shape corresponding with that of the gear housing and held in slightly spaced relation to the end plate 4 so as not to interfere with its sound-producing qualities.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

An alarm for a reel, comprising in combination, a frame, a reel having a shaft extending outwardly from both ends of the frame and rotatably mounted therein by means of said shaft, a sound-producing element mounted upon the frame, a driving gear secured to one end of said shaft, a driven gear rotatably attached to said frame, a clapper carried by said driven gear and adapted for rotation thereby into intermittent contact with said sound-producing element, a shifting plate slidably mounted on said frame, a gear carried by said shifting plate and adapted to be moved into simultaneous engagement with said driving and driven gears to impart rotation to the driven gear and said clapper upon rotation of the driving gear, and adjustable means extending inwardly from said sound-producing element into the path of movement of said clapper.

JOHN J. SEIFERT.

REFERENCES CITED

The following references are of record in the file of this patent:

UNITED STATES PATENTS

| Number | Name | Date |
| --- | --- | --- |
| 253,090 | Ohaver et al. | Jan. 31, 1882 |
| 685,185 | Smith | Oct. 22, 1901 |
| 827,972 | Grignon | Aug. 7, 1906 |